US008826538B2

(12) United States Patent
Itoh (10) Patent No.: US 8,826,538 B2
(45) Date of Patent: Sep. 9, 2014

(54) BRACKET AND METHOD FOR ATTACHING HEAT EXCHANGER

(75) Inventor: Akihide Itoh, Obu (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 13/416,313

(22) Filed: Mar. 9, 2012

(65) Prior Publication Data

US 2012/0227239 A1 Sep. 13, 2012

(30) Foreign Application Priority Data

Mar. 11, 2011 (JP) ................. 2011-054207

(51) Int. Cl.
*B21D 53/02* (2006.01)
*F28F 9/00* (2006.01)
*B60K 11/04* (2006.01)

(52) U.S. Cl.
CPC ............. *B60K 11/04* (2013.01); *F28F 9/002* (2013.01); *F01P 2070/52* (2013.01)
USPC ............. 29/890.03; 29/525.03; 29/525.08; 180/68.4; 180/68.6

(58) Field of Classification Search
CPC ...... B23P 15/26; B60K 11/04; B62D 25/084; F28F 2275/143; F28F 9/002; F01P 2070/52
USPC ........... 29/890.08, 525.03, 525.08; 180/68.4, 180/68.6
See application file for complete search history.

(56) References Cited

U.S. PATENT DOCUMENTS

| | | | | |
|---|---|---|---|---|
| 4,196,774 A | * | 4/1980 | Hoffmann | 165/67 |
| 5,205,349 A | * | 4/1993 | Nagao et al. | 165/67 |
| 6,364,403 B1 | * | 4/2002 | Ozawa et al. | 296/187.09 |
| 7,882,913 B2 | * | 2/2011 | Maeda et al. | 180/68.4 |
| 2002/0157812 A1 | | 10/2002 | Anderson et al. | |
| 2003/0062148 A1 | * | 4/2003 | Ohki | 165/41 |
| 2007/0251669 A1 | * | 11/2007 | Hamida et al. | 165/67 |
| 2008/0185200 A1 | | 8/2008 | Streeter | |

FOREIGN PATENT DOCUMENTS

| | | |
|---|---|---|
| EP | 1 253 394 | 10/2002 |
| JP | 2002-002312 | 1/2002 |
| WO | WO 2006/026591 | 3/2006 |

OTHER PUBLICATIONS

Office action dated Jul. 26, 2013 in corresponding Australian Application No. 2012201449.

* cited by examiner

*Primary Examiner* — David Bryant
*Assistant Examiner* — Jun Yoo
(74) *Attorney, Agent, or Firm* — Harness, Dickey & Pierce, PLC (57) ABSTRACT

A bracket attaches a heat exchanger to a supporting member. The bracket includes a vibration-proof member, and first and second bracket members. The first member is fixed to the supporting member. The second member is joined to a projection of the heat exchanger through the vibration-proof member. The second member is attached to the first member. The second member includes a joining part and an attaching part. The projection is inserted in the joining part from a projecting direction of the projection so that the joining part is joined to the projection with the vibration-proof member intervening therebetween. The attaching part is inserted in the first member from a direction that intersects with a joining direction in which the joining part is joined to the projection, so that the attaching part is attached to the first member at an arbitrary position of the first member in the joining direction.

15 Claims, 7 Drawing Sheets

BRACKET AND METHOD FOR ATTACHING HEAT EXCHANGER

CROSS REFERENCE TO RELATED APPLICATION

This application is based on Japanese Patent Application No. 2011-54207 filed on Mar. 11, 2011, the disclosure of which is incorporated herein by reference.

TECHNICAL FIELD

The present disclosure relates to a bracket and a method for attaching a heat exchanger.

BACKGROUND

Conventionally, a heat exchanger for a vehicle such as a radiator is attached to a vehicle body-side supporting member (e.g., front end panel) through a bracket having a vibration proof member made of an elastic body. The heat exchanger of this kind is supported by the vehicle using the vibration proof member (e.g., rubber). However, in its mount condition, the heat exchanger is not appropriately supported so that a vibration-proof function of the member may be hindered.

As measures against such a hindrance to the vibration-proof function, a configuration of the bracket that can compensate a size variation of the heat exchanger by the bracket for attaching the heat exchanger to the supporting member is proposed (see, for example, WO2006-026591).

A bracket described in WO2006-026591 is constituted of a fixed member that is fixed to a vehicle body (supporting member), and a movable member that is configured slidably along a guide formed at the fixed member and that includes a joining section coupled with a heat exchanger. Accordingly, by sliding the movable, member to an appropriate position in accordance with a shape of the heat exchanger to adjust a joint position between the movable member and the heat exchanger, a size variation of the heat exchanger can be compensated at the bracket.

Specifically, at the time of attachment of the heat exchanger, the movable member of the bracket slides on the guide formed at the fixed member along a projecting direction of a projection (pin) formed on the heat exchanger. A vibration proof member including a hole region, into which the projection of the heat exchanger can be inserted, is attached to a region of the movable member opposed to the projection of the heat exchanger.

By sliding the movable member to approach the heat exchanger with the fixed member fixed to the supporting member, the projection of the heat exchanger is inserted into the hole region of the vibration proof member of the movable member. The movable member and the heat exchanger are joined together with the vibration proof member pressed.

A ratchet mechanism for limiting a sliding direction of the movable member to a direction in which the movable member approaches the heat exchanger is provided for the guide of the fixed member and a region of the movable member opposed to the guide. The projection of the heat exchanger is not removed from the hole region of the vibration proof member.

As described in WO2006-026591, at the time of attachment of the heat exchanger to the supporting member, the heat exchanger and the bracket are joined together by sliding the movable member in the projecting direction of the projection of the heat exchanger. As a result, in accordance with a slide amount of the movable member, excess force is applied to the vibration proof member provided for the movable member, so that a variation occurs in a press allowance of the vibration proof member. If the press allowance of the vibration proof member varies in this manner, vibration cannot be appropriately absorbed by the vibration proof member, so that the heat exchanger may not be properly protected.

SUMMARY

According to the present disclosure, there is provided a bracket for attaching a heat exchanger to a supporting member. The bracket includes a vibration proof member, a first bracket member, and a second bracket member. The vibration proof member is formed from an elastic body, and the heat exchanger is attached to the supporting member through the vibration proof member. The first bracket member is fixed to the supporting member. The second bracket member is joined to a projection, which is formed to project from the heat exchanger, through the vibration proof member, and the second bracket member is attached to the first bracket member. The second bracket member includes a joining part and an attaching part. The projection is inserted in the joining part from a projecting direction of the projection so that the joining part is joined to the projection with the vibration proof member intervening therebetween. The attaching part is inserted in the first bracket member from a direction that intersects with a joining direction in which the joining part is joined to the projection, so that the attaching part is attached to the first bracket member at an arbitrary position of the first bracket member in the joining direction.

According to the present disclosure, there is also provided a method for attaching a heat exchanger to a supporting member through a bracket. The bracket includes a vibration proof member, a first bracket member, and a second bracket member. The vibration proof member is made of an elastic body. The first bracket member is fixed to the supporting member. The second bracket member is joined to a projection, which is formed to project from the heat exchanger, through the vibration proof member, and the second bracket member is attached to the first bracket member. The second bracket member includes a joining part and an attaching part. The joining part is joined to the projection with the vibration proof member intervening therebetween. The attaching part is attached to the first bracket member at an arbitrary position of the first bracket member in a joining direction in which the joining part is joined to the projection. According to the method, a fixing process is performed. In the fixing process, the first bracket member is fixed to the supporting member. Furthermore, a joining process is performed. In the joining process, the projection is inserted into the joining part from a projecting direction of the projection so as to join the second bracket member to the heat exchanger. In addition, an attachment process is performed. In the attachment process, the second bracket member is inserted into the first bracket member from a direction that is perpendicular to the joining direction after the joining process, so as to attach the attaching part to the first bracket member.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An embodiment will be described below with reference to FIGS. 1 to 7C.

In the present embodiment, a bracket 3 is applied to a radiator attachment bracket for attaching a radiator 1 which is a heat exchanger to a front end panel 2 of a vehicle body which is a supporting member.

Figure 1:
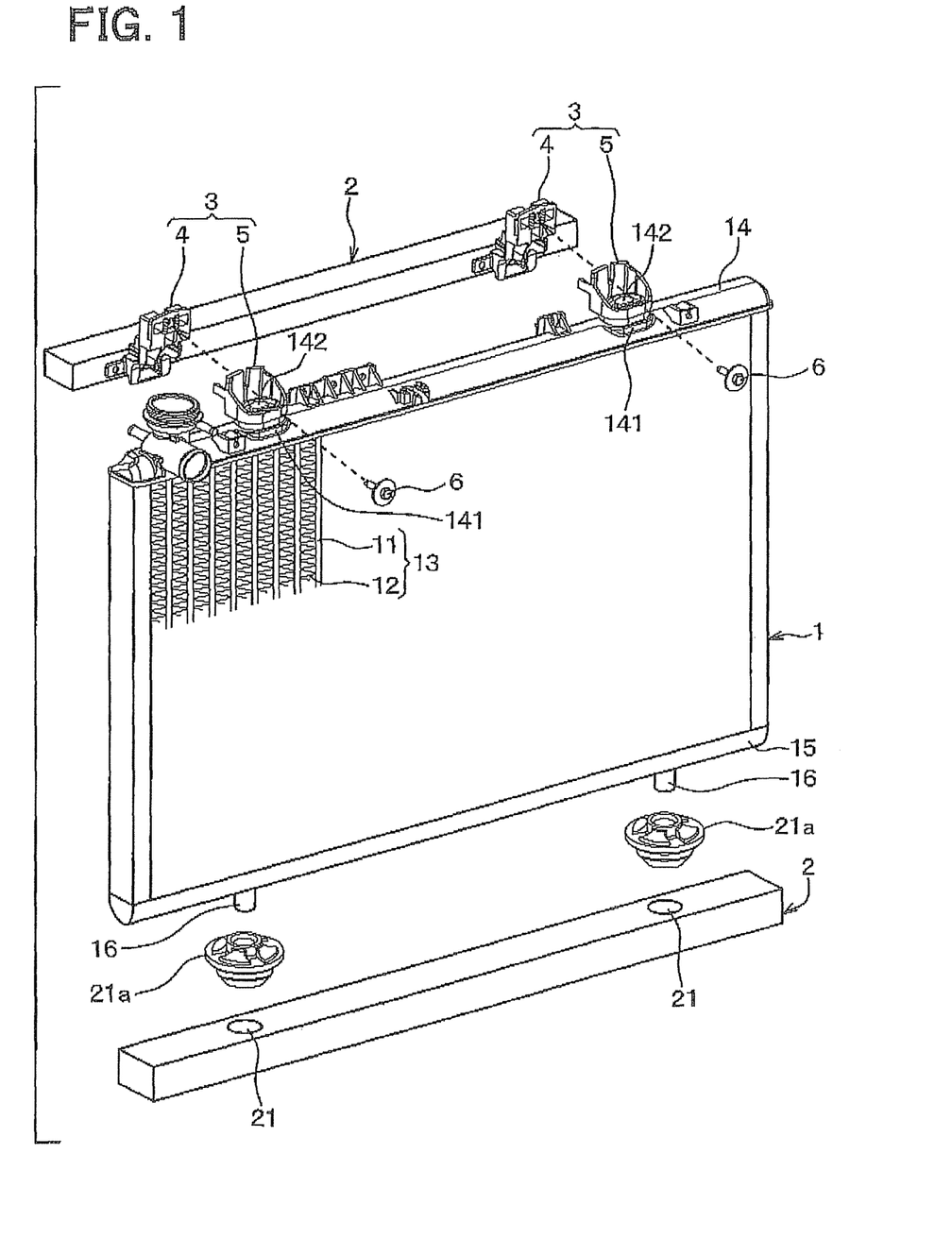
FIG. 1 is a front view illustrating an entire configuration of a heat exchanger in accordance with an embodiment.

The radiator 1 includes a heat exchange core part 13 having tubes 11, through which cooling water flows, and a corrugated fin 12 which is joined on an outer surface of the tube 11, and a pair of tanks 14, 15 connected to both ends of the tube 11 in its longitudinal direction.

The components of the radiator 1 of the present embodiment such as the tube 11, the fin 12, and the pair of tanks 14, 15 are made of an aluminum or aluminum alloy, for example. The components are integrally configured by a brazing joint, for example.

The pair of tanks 14, 15 include the tank on the upper side in FIG. 1 which is an upper tank portion 14 that distributes cooling water to each tube 11, and the tank on the lower side in FIG. 1 which is a lower tank portion 15 where cooling water flowing out of the tubes 11 merges.

A supporting member 16, which is fitted into a fitting hole portion 21 formed on a lower end side of the front end panel 2 through a vibration proof rubber 21a, is provided for the lower tank portion 15 of the radiator 1 on both end sides of the tank portion 15 in its longitudinal direction. This supporting member 16 is for holding a lower end side of the radiator 1, and is fixed to the lower tank portion 15 by insertion or the like.

A pedestal portion 141 for attaching a second bracket member 5 which is described in greater detail hereinafter, and a cylindrical projection 142 projecting upward from the pedestal portion 141 are provided for the upper tank portion 14 of the radiator 1 in a protruding manner on both end sides of the tank portion 14 in its longitudinal direction. A pawl part 142a projecting outward is formed at an end of this projection 142.

Figure 2:
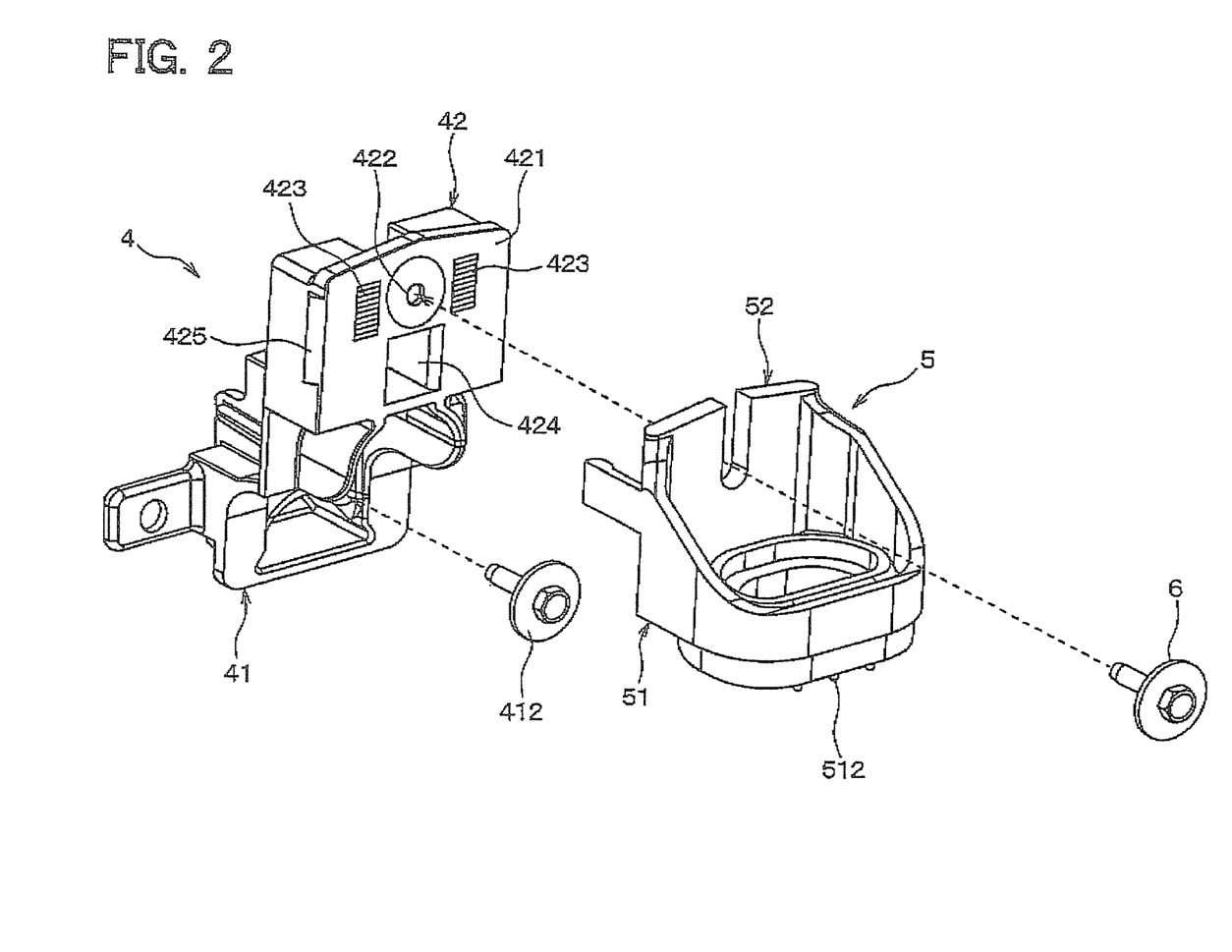
FIG. 2 is an exploded perspective view illustrating a bracket in accordance with the embodiment.

As illustrated in FIG. 2, the bracket 3 of the present embodiment includes a first resin bracket member 4 that is fixed on an upper end side of the front end panel 2 which is the supporting member, the second resin bracket member 5 that is joined to the projection 142 with the bracket member 5 seated on the pedestal portion 141 of the upper tank portion 14 of the radiator 1, and a bolt-like fastening member 6 that fastens together the first bracket member 4 and the second bracket member 5.

A detailed structure of the bracket members 4, 5 of the present embodiment will be described with reference to FIGS. 2 to 5B.

Figure 3A:
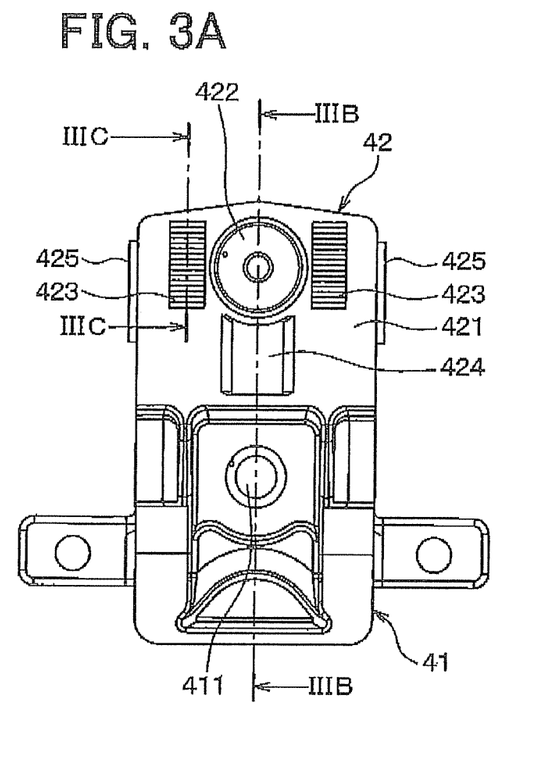
FIG. 3A is a front view illustrating a first bracket member viewed from its flat surface side in accordance with the embodiment.
Figure 3B:
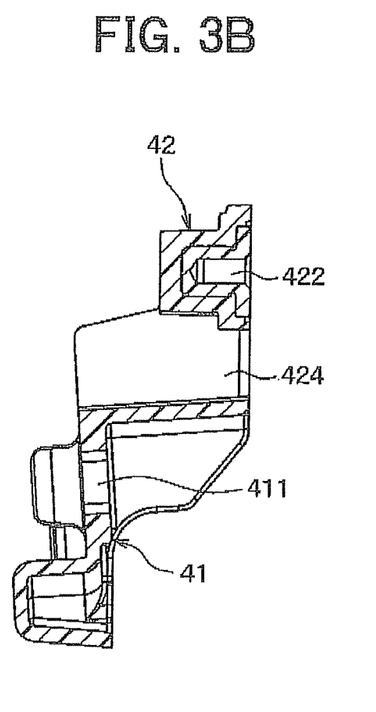
FIG. 3B is a sectional view taken along a line IIIB-IIIB in FIG. 3A.
Figure 3C:
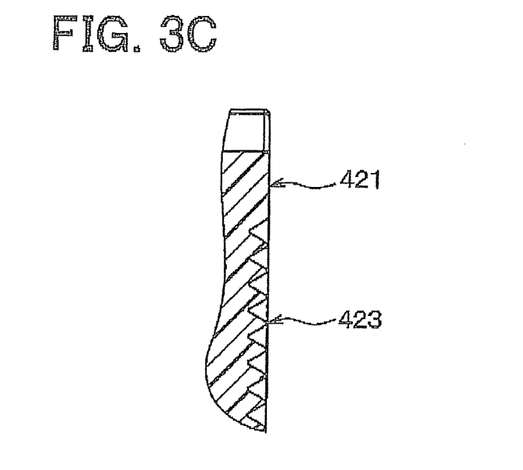
FIG. 3C is a sectional view taken along a line IIIC-IIIC in FIG. 3A.

As illustrated in FIGS. 2 to 3C, the first bracket member 4 includes a panel side fixing part 41 having a fixation hole 411, and an attached part 42 which is formed integrally with the panel side fixing part 41 and on which the second bracket member 5 is attached.

The first bracket member 4 is fixed to the front end panel 2 by clamping the bolt 412 to a nut (not shown) provided on the front end panel 2-side with a fastening bolt 412 inserted in the fixation hole 411 of the panel side fixing part 41.

A flat surface 421 extending in the up-down direction is formed on a region of the attached part 42 of the first bracket member 4 opposed to the second bracket member 5. A nut that includes a female screw portion 422 having a thread groove is embedded in a generally central part of the flat surface 421.

Engaging groove portions 423 including V-shaped grooves, which extend in their width direction and which are arranged in the up-down direction, are formed on this flat surface 421 on both sides of the female screw portion 422 (see FIG. 3C). A guide hole region 424 passing through the flat surface 421 is formed at the flat surface 421 downward of the female screw portion 422, to extend in the up-down direction.

Engaging projections 425, which are engaged with end portions 525a of a pair of arm portions 525 at an attaching part 52 of the second bracket member 5, are formed at lateral side walls of the attached part 42 on its both sides. The engaging projection 425 is formed to extend in the up-down direction such that the pair of arm portions 525 of the second bracket member 5 are engageable at any position of the attached part 42 of the first bracket member 4 in the up-down direction (projecting direction of the projection 142).

Figure 4A:
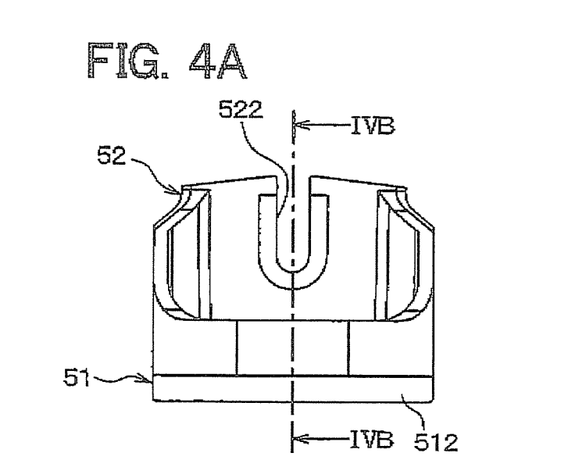
FIG. 4A is a front view illustrating a second bracket member in accordance with the embodiment.
Figure 4B:
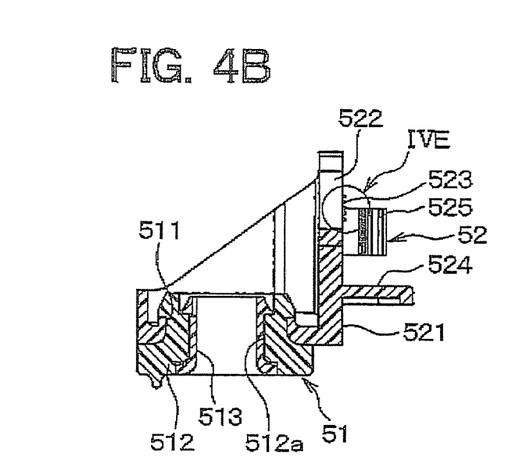
FIG. 4B is a sectional view taken along a line IVB-IVB in FIG. 4A.
Figure 4C:
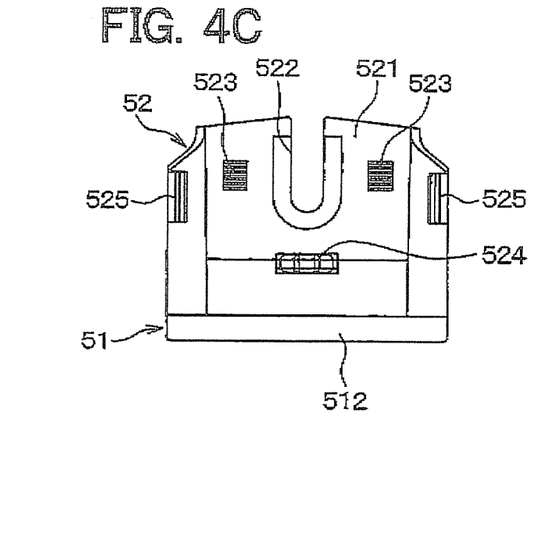
FIG. 4C is a back view (first bracket member side) of FIG. 4A.
Figure 4D:
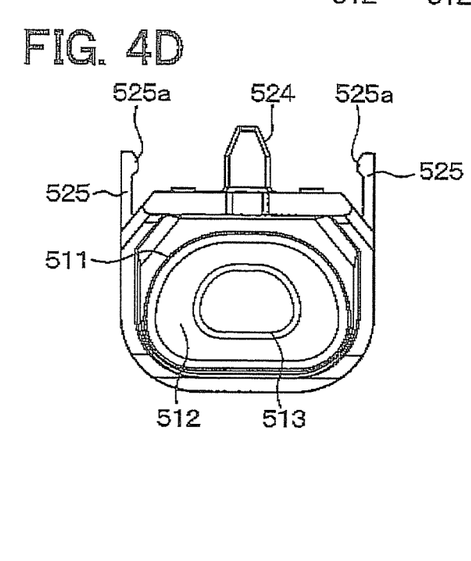
FIG. 4D is a top view illustrating the second bracket member in accordance with the embodiment.
Figure 4E:
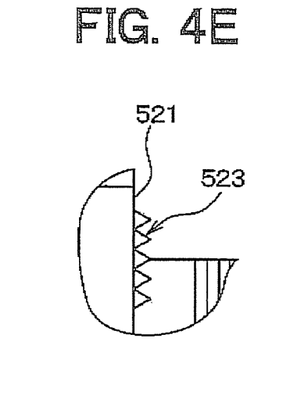
FIG. 4E is a sectional view illustrating an area IVE in FIG. 4B.

As illustrated in FIGS. 2 and 4A to 4E, the second bracket member 5 includes a joining part 51 that is joined to the projection 142 provided on the pedestal portion 141 of the upper tank portion 14 of the radiator 1, and the attaching part 52 which is formed integrally with the joining part 51 and which is attached to the attached part 42 of the first bracket member 4. As illustrated in FIG. 4B, the second bracket member 5 has an L-shaped surface of section. The bracket member 5 includes the joining part 51 at its bottom part, and a ridge that rises perpendicularly from the bottom part serves as the attaching part 52.

The joining part 51 of the second bracket member 5 is coupled with the projection 142, with a vibration proof member 512 between the joining part 51 and the pedestal portion 141, through the insertion of the projection 142 provided for the radiator 1 in its projecting direction.

Specifically, as illustrated in FIG. 4B, the joining part 51 of the second bracket member 5 includes the vibration proof member 512 made of an elastic body (e.g., rubber) which is engaged with a peripheral edge of an elliptical opening 511 that opens on the bottom part of the joining part 51.

Figure 5A:
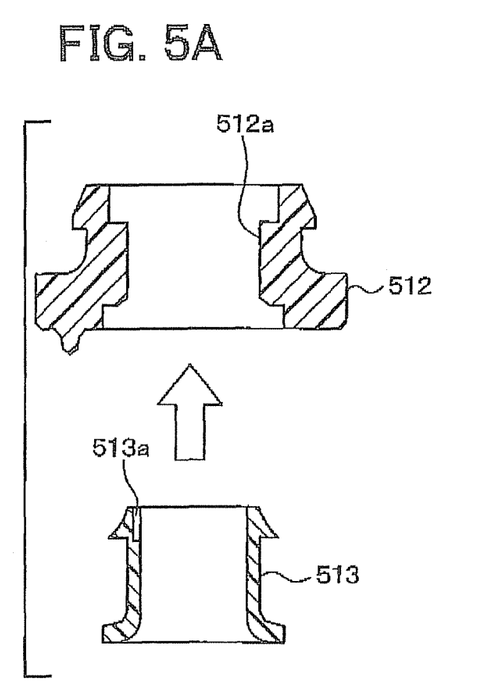
FIG. 5A is an exploded sectional view illustrating a vibration proof member of the second bracket member in accordance with the embodiment.
Figure 5B:
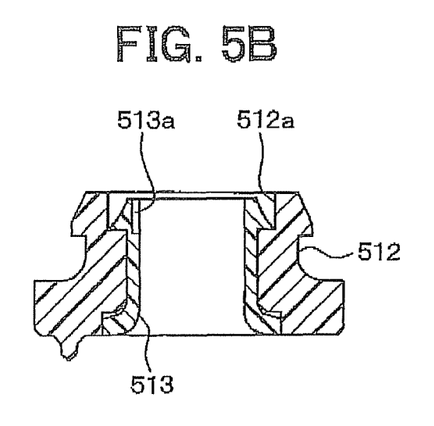
FIG. 5B is a sectional view illustrating the vibration proof member in accordance with the embodiment.

As illustrated in FIGS. 5A and 5B, the vibration proof member 512 includes a through hole 512a at its central part. A cylindrical part 513, in which the projection 142 of the upper tank portion 14 of the radiator 1 is inserted, is provided in the through hole 512a. An engaging groove 513a that is engaged with the pawl part 142a of the projection 142 is formed on the cylindrical part 513.

The second bracket member 5 is joined to the projection 142 of the upper tank portion 14 with the vibration proof member 512 located between the joining part 51 and the pedestal portion 141 through the insertion of the projection 142 of the upper tank portion 14 into the cylindrical part 513 of the joining part 51 in its projecting direction (up-down direction in the present embodiment). At the time of the insertion of the projection 142 into the cylindrical part 513 of the joining part 51, the vibration proof member 512 is pressed so as to have a desired press allowance.

The attaching part 52 of the second bracket member 5 is attached to the first bracket member 4 through the insertion of the attaching part 52 into the attached part 42 of the first bracket member 4 in a direction perpendicular to a longitudinal direction of the cylindrical part 513 (projecting direction of the projection 142 of the upper tank portion 14).

Specifically, a flat surface 521 corresponding to the flat surface 421 of the attached part 42 is formed at a region of the attaching part 52 of the second bracket member 5 opposed to the attached part 42 of the first bracket member 4. A notch hole 522 is formed through the flat surface 521 at a position corresponding to the female screw portion 422 of the attached part 42. A U-shaped hole extending upward so that the fastening member 6, which is described in greater detail hereinafter, can be inserted into this hole, serves as this notch hole 522.

Engaging projections 523 composed of V-shaped projections, which extend in their width direction on both sides of the notch hole 522 and which are arranged in the up-down direction, are formed on the flat surface 521 of the attaching part 52. This engaging projection 523 has a shape corresponding to the engaging groove portion 423 of the attached part 42 of the first bracket member 4 (see FIG. 4E).

A plate-like guide portion 524 projecting toward the attached part 42 of the first bracket member 4 is provided downward of the notch hole 522 on the flat surface 521 of the attaching part 52. This guide portion 524 is formed so as to be inserted into the guide hole region 424 in the attached part 42 of the first bracket member 4. The guide portion 524 is provided as an auxiliary member at the time of attachment of the attaching part 52 to the attached part 42.

The pair of arm portions 525 extending toward the attached part 42 of the first bracket member 4 are formed at the lateral side walls on both sides of the attaching part 52. The end portions 525a of the pair of arm portions 525 have shapes projecting inward of the arm portions 525.

The end portions 525a of the pair of arm portions 525 are configured to be engaged with the engaging projections 425 of the attached part 42 in a direction (horizontal direction in the present embodiment) perpendicular to a direction of joining of the cylindrical part 513 and the projection 142, i.e., the projecting direction of the projection 142 (up-down direction in the present embodiment).

Accordingly, the pair of arm portions 525 can be attached to the attached part 42 of the first bracket member 4 by the insertion of the arm portions 525 into the first bracket member 4 from the direction (horizontal direction in the present embodiment) perpendicular to the direction of joining of the cylindrical part 513 and the projection 142, i.e., the projecting direction of the projection 142 (up-down direction in the present embodiment). The engaging projection 425, which is formed at the attached part 42 of the first bracket member 4, is formed to extend in the up-down direction. Therefore, through the adjustment of engagement positions between the pair of arm portions 525 and the engaging projections 425, the second bracket member 5 can be attached to the first bracket member 4 at a given position of the bracket member 4 in the up-down direction (projecting direction of the projection 142).

The fastening member 6 is for fastening together the attached part 42 of the first bracket member 4 and the attaching part 52 of the second bracket member 5. A male screw portion that is screwed to the female screw portion 422 of the first bracket member 4 is formed at a front end portion of the fastening member 6. By fastening of the fastening member 6 to the female screw portion 422 of the first bracket member 4 through the notch hole 522 of the attaching part 52 of the second bracket member 5, the first bracket member 4 and the second bracket member 5 are firmly joined together.

A method for attaching the radiator 1 to the front end panel 2, which is a supporting member, by means of the above-described bracket 3 will be explained in reference to FIGS. 6A to 7C. For convenience, illustrations of the radiator 1 and the front end panel 2 are omitted in FIGS. 6A and 6B, and the illustration of the front end panel 2 is omitted in FIGS. 7A to 7C.

First, the bolt 412 is inserted into the fixation hole 411 of the panel side fixing part 41 of the first bracket member 4. By screwing the bolt 412 to the nut provided on the front end panel 2-side, the first bracket member 4 is fixed to the front end panel 2 (fixing process).

Figure 7A:
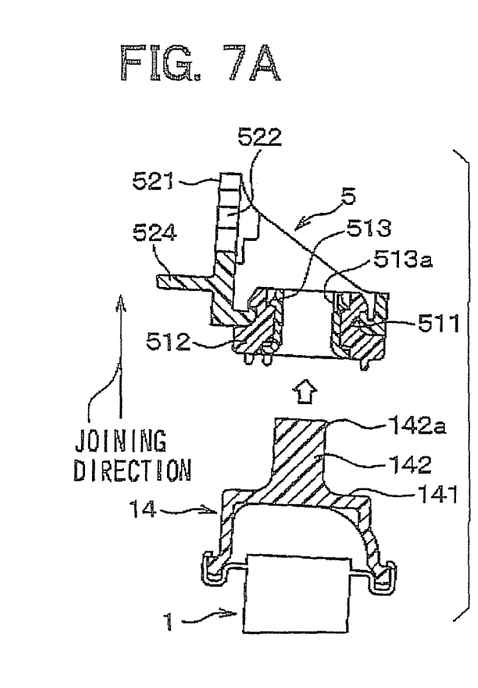
FIG. 7A is a side sectional view illustrating the method for attachment of the first bracket member and the second bracket member and indicating a state before attachment of a radiator and the second bracket member in accordance with the embodiment.
Figure 7B:
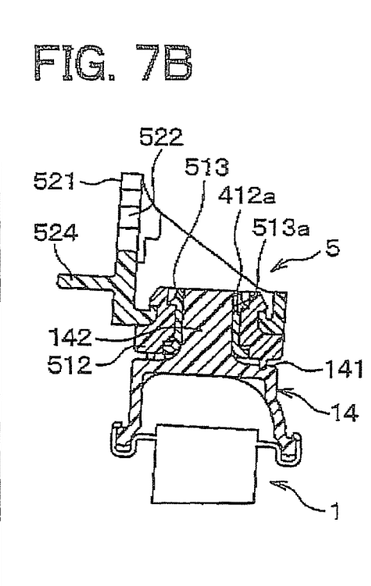
FIG. 7B is a side sectional view illustrating the method for attachment of the first bracket member and the second bracket member and indicating a state after the attachment of the radiator and the second bracket member in accordance with the embodiment.
Figure 7C:
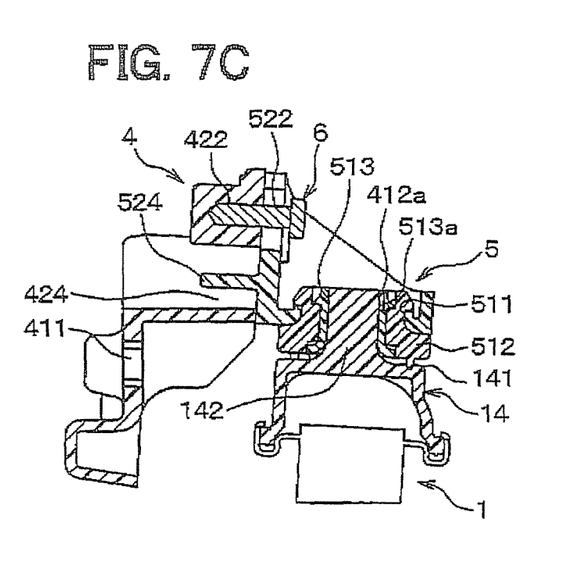
FIG. 7C is a side sectional view illustrating the method for attachment of the first bracket member and the second bracket member and indicating a state after the attachment of the first bracket member and the second bracket member in accordance with the embodiment.

Then, as illustrated in FIGS. 7A and 7B, the projection 142 of the upper tank portion 14 of the radiator 1 is inserted into the cylindrical part 513 of the joining part 51 of the second bracket member 5 in the projecting direction of the projection 142. The pawl part 142a of the projection 142 is engaged with the engaging groove 513a of the cylindrical part 513, so that the second bracket member 5 is joined to the projection 142 of the upper tank portion 14 of the radiator 1 (joining process).

Next, with the second bracket member 5 attached to the upper tank portion 14, the supporting member 16 on a lower end side of the radiator 1 is fitted into the fitting hole portion 21 of the front, end panel 2 via the vibration proof rubber 21a, and the lower end side of the radiator 1 is attached to the front end panel 2.

Figure 6A:
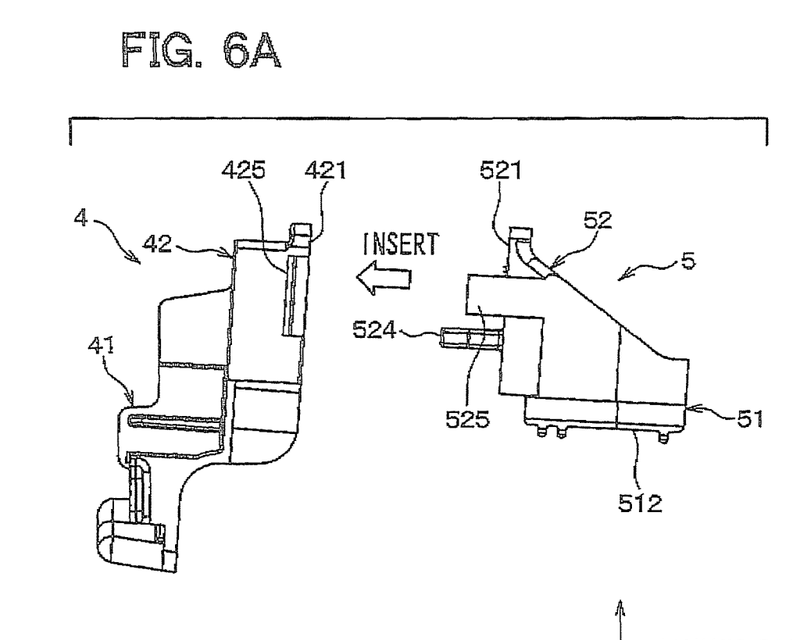
FIG. 6A is a side view illustrating a method for attachment of the first bracket member and the second bracket member and indicating a state before the attachment in accordance with the embodiment.
Figure 6B:
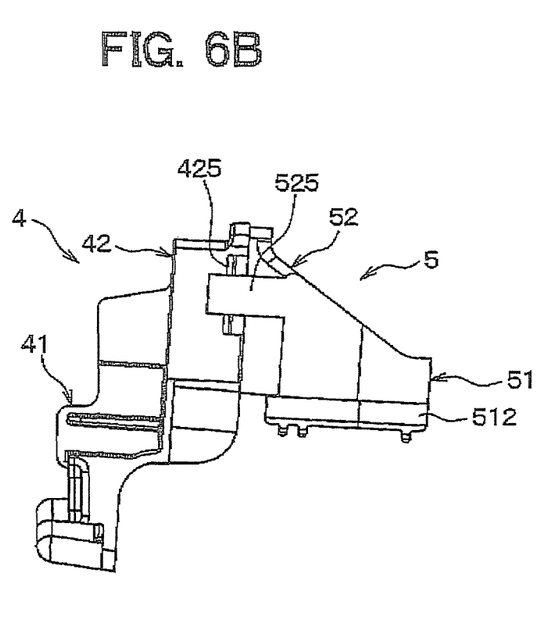
FIG. 6B is a side view illustrating the method for attachment of the first bracket member and the second bracket member and indicating a state after the attachment in accordance with the embodiment.

Following this, as illustrated in FIGS. 6A and 6B, the guide portion 524 of the attaching part 52 of the second bracket member 5 is inserted into the guide hole region 424 of the attached part 42 of the first bracket member 4. Subsequently, the pair of arm portions 525 of the attaching part 52 of the second bracket member 5 is inserted on both lateral side walls of the attached part 42 at an appropriate position of the first bracket member 4 in the up-down direction in accordance with a size variation of the radiator 1. Accordingly, the attaching part 52 of the second bracket member 5 is inserted in the attached part 42 of the first bracket member 4.

In this process, the attaching part 52 of the second bracket member 5 is inserted in the attached part 42 of the first bracket member 4 from a direction perpendicular to the direction of connection of the projection 142 of the upper tank portion 14 of the radiator 1 and the joining part 51 of the second bracket 5, in order that excess force is not applied to the vibration proof member 512 of the joining part 51 of the second bracket 5.

After that, the attaching part 52 of the second bracket 5 is inserted up to a position of contact between the flat surface 521 of the attaching part 52 and the flat surface 421 of the attached part 42. The end portion 525a of each arm portion 525 of the attaching part 52 of the second bracket member 5 is engaged with the engaging projection 425 on the attached part 42 of the first bracket member 4.

In this process, the engaging projection 523 formed on the flat surface 521 of the attaching part 52, and the engaging groove portion 423 formed on the flat surface 421 of the attached part 42 are engaged with each other. Accordingly, a misalignment of an attachment position of the second bracket member 5 to the first bracket member 4 in the direction of coupling the projection 142 of the radiator 1 and the joining part 51 of the second bracket 5 can be prevented. In the present embodiment, the engaging groove portion 423 provided for the attached part 42 of the first bracket member 4, and the engaging projection 523 provided for the attaching part 52 of the second bracket member 5 may serve as movement restricting portions for restricting the movement of the attachment position of the second bracket member 5 to the first bracket member 4 in the direction of the joint of the projection 142 of the second bracket member 5, which is attached to the first bracket member 4, and the joining part 52.

In this manner, the attaching part 52 of the second bracket member 5 is attached to the attached part 42 of the first bracket member 4, so that temporary fixation of the first bracket member 4 and the second bracket member 5 is completed (attachment process).

Lastly, by fastening the fastening member 6 into the female screw portion 422 of the first bracket member 4 with the notch hole 522 of the second bracket member 5 therebetween, the first bracket member 4 and the second bracket member 5 are finally tightened together, and the radiator 1 is thereby attached to the front end panel 2.

According to the present embodiment described above, the radiator 1 can be attached to the front end panel 2 as a result of the attachment of the second bracket member 5, with which the radiator 1 is joined, to the first bracket member 4 fixed to the front end panel 2, which is a supporting member.

In the present embodiment, because of the attachment of the attaching part 52 of the second bracket member 5 to the attached part 42 of the first bracket member 4 at a desired position of the first bracket member 4 in the direction of joining the projection 142 of the radiator 1 and the joining part 51 of the second bracket member 5, the radiator 1 can be supported without hindering a vibration-proof function through the adjustment of the attachment position of the second bracket member 5 to the first bracket member 4.

In the present embodiment, the second bracket member 5 is inserted in and attached to the first bracket member 4 in the direction perpendicular to the direction of connection of the projection 142 of the radiator 1 and the joining part 51 of the second bracket member 5. Accordingly, the second bracket member 5 can be attached to the first bracket member 4 without application of excess force to the vibration proof member 512 located between the joining part 51 and the pedestal portion 141.

Consequently, by attaching the radiator 1 to the front end panel 2 by means of the bracket 3 of the present embodiment, a variation in size of the radiator 1 is compensated and the variation in the press allowance of the vibration proof member 512 can be limited.

In addition, at the time of attachment of the second bracket member 5 to the first bracket member 4, owing to the engagement of the engaging groove portion 423 provided for the attached part 42 of the first bracket member 4 and the engaging projection 523 formed on the second bracket member 5, a shift of the attachment position of the second bracket member 5 to the first bracket member 4 in the direction of joining the projection 142 of the radiator 1 and the joining part 51 of the second bracket member 5 can be limited.

Modifications of the above embodiment will be described. The embodiment of the present disclosure has been described above. Nevertheless, the present disclosure is not limited to this embodiment, and an improvement based on knowledge that a person skilled in the art usually has can be appropriately added without departing from the scope of the disclosure. For example, the present disclosure can be variously modified as follows.

In the above embodiment, the first bracket member 4 and the second bracket member 5 are fastened together by way of the bolt-like fastening member 6. However, the fastening member 6 is not limited to this, and the fastening member 6 may be configured using, for example, a pin or rivet.

In the above embodiment, as the movement restricting portion, the engaging groove portion 423 is provided for the first bracket member 4, and the engaging projection 523 is provided for the second bracket member 5. However, the movement restricting portion is not limited to this embodiment. For example, an engaging projection may be provided for the first bracket member 4, and an engaging groove portion may be provided for the second bracket member 5. The engaging groove portion 423 and the engaging projection 523 are not necessarily V-shaped as long as they are shapes engageable to each other, and the groove portion 423 and the projection 523 may have the other shapes. Although the engaging groove portion 423 and the engaging projection 523 may be formed for the movement restricting portions, for example, if the position misalignment at the time of attachment of the second bracket member 5 to the first bracket member 4 is not easily caused, the engaging groove portion 423 and the engaging projection 523 serving as the movement restricting portions do not need to be provided.

In the above embodiment, the guide hole region 424 is provided for the first bracket member 4, and the guide portion 524 which can be inserted into the guide hole region 424 is provided for the second bracket member 5. However, the present disclosure is not limited to this embodiment. For example, the first bracket member 4 may be provided with a guide portion, and the second bracket member 5 may be provided with a guide hole region, in which the guide portion is inserted.

In the above embodiment, the first bracket member 4 is provided with the engaging projection 425, and the second bracket member 5 is provided with the pair of arm portions 525 including the end portion 525a which is engaged with the engaging projection 425. However, the present disclosure is not limited to this embodiment. For example, a pair of arm portions may be provided for the first bracket member 4, and an engaging projection which engages the pair of arm portions may be provided for the second bracket member 5.

Moreover, the structure of engagement of the first bracket member 4 and the second bracket member 5 is not limited to the structure of engagement of the end portions 525a of the pair of arm portions 525 with the engaging projection 425. For example, such a structure that a pawl part is hooked on a groove portion may be employed for the structure of engagement.

In the above embodiment, the attachment of the radiator 1 to the front end panel 2 of the vehicle body by means of the bracket 3 has been illustrated. However, the present disclosure is not limited to this embodiment. For example, the radiator 1 may be attached to a supporting member other than the front end panel 2. Furthermore, the heat exchanger such as an evaporator or condenser which constitutes a refrigeration cycle, may be attached to the supporting member by means of the bracket 3.

To sum up, the bracket 3 and the method for attaching the heat exchanger 1 in accordance with the above embodiment may be described as follows.

A bracket 3 is for attaching a heat exchanger 1 to a supporting member 2. The bracket 3 includes a vibration proof member 512, a first bracket member 4, and a second bracket member 5. The vibration proof member 512 is formed from an elastic body, and the heat exchanger 1 is attached to the supporting member 2 through the vibration proof member 512. The first bracket member 4 is fixed to the supporting member 2. The second bracket member 5 is joined to a projection 142, which is formed to project from the heat exchanger 1, through the vibration proof member 512, and the second bracket member 5 is attached to the first bracket member 4. The second bracket member 5 includes a joining part 51 and an attaching part 52. The projection 142 is inserted in the joining part 51 from a projecting direction of the projection 142 so that the joining part 51 is joined to the projection 142 with the vibration proof member 512 intervening therebetween. The attaching part 52 is inserted in the first bracket member 4 from a direction that intersects with a joining direction in which the joining part 51 is joined to the projection 142, so that the attaching part 52 is attached to the first bracket member 4 at an arbitrary position of the first bracket member 4 in the joining direction.

The attaching part 52 may be inserted in the first bracket member 4 from a direction that is perpendicular to the joining direction.

Accordingly, through the attachment of the second bracket member 5, with which the heat exchanger 1 is joined, to the first bracket member 4, which is fixed to the supporting member 2, the heat exchanger 1 can be attached to the supporting member 2.

Furthermore, the second bracket member 5 is attached to the first bracket member 4 at a desired position of the first bracket member 4 in the direction of joining of the projection 142 of the heat exchanger 1 and the joining part 51 of the second bracket member 5. Accordingly, the variation in size of the heat exchanger 1 is absorbable.

In addition, the second bracket member 5 is inserted in and attached to the first bracket member 4 in the direction perpendicular to the direction of connection of the projection 142 of the heat exchanger 1 and the joining part 51 of the second bracket member 5. Accordingly, the second bracket member 5 can be attached to the first bracket member 4 without application of excess force to the vibration proof member 512 located between the joining part 51 and the pedestal portion 141.

Therefore, a variation in a press allowance of the vibration proof member 512 of the bracket can be limited with a variation in size of the heat exchanger 1 compensated. "A joining direction in which the joining part 51 is joined to the projection 142" is a direction that coincides with "a projecting direction of the projection 142".

The first bracket member 4 may include a first movement restricting portion 423 on a first region thereof. The second bracket member 5 may further include a second movement restricting portion 523 on a second region thereof. The first region and the second region are opposed to each other. The first and second movement restricting portions 423, 523 are configured to restrict a relative movement between the first bracket member 4 and the second bracket member 5 in the joining direction.

Accordingly, at the time of attachment of the second bracket member 5 to the first bracket member 4, a shift of the attachment position of the second bracket member 5 to the first bracket member 4 in the direction of joining the projection 142 of the heat exchanger 1 and the joining part 51 of the second bracket member 5 can be limited.

The bracket 3 may further include a fastening member 6 configured to fasten together the first bracket member 4 and the second bracket member 5 in a direction that is perpendicular to the joining direction with the second bracket member 5 attached to the first bracket member 4.

In this manner, with the second bracket member 5 attached to the first bracket member 4, by fastening together the first bracket member 4 and the second bracket member 5 through the fastening member 6 in the direction perpendicular to the direction of connection of the projection 142 of the heat exchanger 1 and the joining part 51 of the second bracket member 5, joining force between the first bracket member 4 and the second bracket member 5 can be further reinforced.

A method is for attaching a heat exchanger 1 to a supporting member 2 through a bracket 3. The bracket 3 includes a vibration proof member 512, a first bracket member 4, and a second bracket member 5. The vibration proof member 512 is made of an elastic body. The first bracket member 4 is fixed to the supporting member 2. The second bracket member 5 is joined to a projection 142, which is formed to project from the heat exchanger 1, through the vibration proof member 512, and the second bracket member 5 is attached to the first bracket member 4. The second bracket member 5 includes a joining part 51 and an attaching part 52. The joining part 51 is joined to the projection 142 with the vibration proof member 512 intervening therebetween. The attaching part 52 is attached to the first bracket member 4 at an arbitrary position of the first bracket member 4 in a joining direction in which the joining part 51 is joined to the projection 142. According to the method, a fixing process is performed. In the fixing process, the first bracket member 4 is fixed to the supporting member 2. Furthermore, a joining process is performed. In the joining process, the projection 142 is inserted into the joining part 51 from a projecting direction of the projection 142 so as to join the second bracket member 5 to the heat exchanger 1. In addition, an attachment process is performed. In the attachment process, the second bracket member 5 is inserted into the first bracket member 4 from a direction that is perpendicular to the joining direction after the joining process, so as to attach the attaching part 52 to the first bracket member 4.

Accordingly, because the second bracket member 5 is attached to the first bracket member 4 at a desired position of the first bracket member 4 in the direction of joining of the projection 142 of the heat exchanger 1 and the joining part 51 of the second bracket member 5, the variation in size of the heat exchanger 1 is absorbable.

The second bracket member 5 is inserted in and attached to the first bracket member 4 in the direction perpendicular to the direction of connection of the projection 142 of the heat exchanger 1 and the joining part 51 of the second bracket member 5. Accordingly, the second bracket member 5 can be attached to the first bracket member 4 without application of excess force to the vibration proof member 512 located between the joining part 51 and the pedestal portion 141.

Therefore, a variation in a press allowance of the vibration proof member 512 of the bracket 3 can be limited with a variation in size of the heat exchanger 1 compensated.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A bracket for attaching a heat exchanger to a supporting member, the bracket comprising:
    a vibration proof member which is formed from an elastic body and through which the heat exchanger is attached to the supporting member;
    a first bracket member that is fixed to the supporting member; and
    a second bracket member that is joined to a projection, which is formed to project from the heat exchanger, through the vibration proof member, the second bracket member is attached to the first bracket member, wherein the second bracket member includes:
    a joining part into which the projection is inserted so that the joining part is joined to the projection with the vibration proof member intervening therebetween, a direction of insertion of the projection into the joining part defining a joining direction; and
    an attaching part that is inserted in the first bracket member from a direction that intersects with the joining direction in which the joining part is joined to the projection, so that the attaching part is attached to the first bracket member at an arbitrary position of the first bracket member in the joining direction; wherein
    the vibration proof member is attached to the second bracket member to be integrated with the second bracket member and to hold the heat exchanger; and the bracket further comprises:
    a fastening member configured to fasten together the first bracket member and the second bracket member, the fastening member extending through the first and second bracket members in a direction perpendicular to the joining direction.

2. The bracket according to claim 1, wherein the attaching part is inserted in the first bracket member from a direction that is perpendicular to the joining direction.

3. The bracket according to claim 1, wherein:
    the first bracket member includes a first movement restricting portion on a first region thereof;
    the second bracket member further includes a second movement restricting portion on a second region thereof;
    the first region and the second region are opposed to each other; and
    the first and second movement restricting portions are configured to restrict a relative movement between the first bracket member and the second bracket member in the joining direction.

4. The bracket according to claim 1, wherein the joining part of the second bracket member defines a closed aperture into which both the vibration proof member and the projection extend.

5. The bracket according to claim 1, wherein the vibration proof member does not directly contact the first bracket member.

6. The bracket according to claim 1, wherein the vibration proof member is in direct contact with only the second bracket member.

7. The bracket according to claim 1, wherein the projection extends into the second bracket member in a first axial direction defined by the projection and the fastening member extends into the first and second bracket members in a second axial direction defined by the fastening member, the second axial direction being perpendicular to the first axial direction.

8. The bracket according to claim 1, wherein the projection extends from the heat exchanger towards the second bracket in a first direction and the fastening member includes a shaft and a head, the shaft extending from the head in a second direction, the second direction being perpendicular to the first direction.

9. A method for attaching a heat exchanger to a supporting member through a bracket, wherein the bracket includes:
    a vibration proof member made of an elastic body:
    a first bracket member that is fixed to the supporting member; and
    a second bracket member that is joined to a projection, which is formed to project from the heat exchanger, through the vibration proof member and that is attached to the first bracket member, the second bracket member including:
    a joining part that is joined to the projection with the vibration proof member intervening therebetween; and
    an attaching part that is attached to the first bracket member at an arbitrary position of the first bracket member in a joining direction in which the projection is inserted into the joining part, the method comprising:
    performing a fixing process, wherein the performing of the fixing process includes fixing the first bracket member to the supporting member;
    performing a joining process, wherein the performing of the joining process includes inserting the projection into the joining part of the second bracket member in the joining direction so as to join the second bracket member to the heat exchanger; and
    performing an attachment process, wherein the performing of the attachment process includes inserting the second bracket member into the first bracket member from a direction that is perpendicular to the joining direction after the joining process, so as to attach the attaching part to the first bracket member; wherein
    the vibration proof member is attached to the second bracket member to be integrated with the second bracket member and to hold the heat exchanger; the method further comprising:
    fastening together the first bracket member and the second bracket member using a fastening member, the fastening member extending through the first and second bracket members in a direction perpendicular to the joining direction.

10. The method according to claim 9, further comprising inserting the vibration proof member into an aperture defined by the second bracket prior to the step of performing the joining process.

11. The method according to claim 9, wherein the joining part of the second bracket member defines a closed aperture into which both the vibration proof member and the projection extend.

12. The method according to claim 9, wherein the vibration proof member does not directly contact the first bracket member.

13. The method according to claim 9, wherein the vibration proof member is in direct contact with only the second bracket member.

14. The bracket according to claim 9, wherein the projection extends into the second bracket member in a first axial direction defined by the projection and the fastening member extends into the first and second bracket members in a second axial direction defined by the fastening member, the second axial direction being perpendicular to the first axial direction.

15. The bracket according to claim 9, wherein the projection extends from the heat exchanger towards the second bracket in a first direction and the fastening member includes a shaft and a head, the shaft extending from the head in a second direction, the second direction being perpendicular to the first direction.

* * * * *